(12) United States Patent
Song et al.

(10) Patent No.: US 11,372,456 B2
(45) Date of Patent: Jun. 28, 2022

(54) ELECTRONIC DEVICE COMPRISING DISPLAY WITH SWITCH

(71) Applicant: Samsung Electronics Co., Ltd., Gyeonggi-do (KR)

(72) Inventors: Junhyeok Song, Gyeonggi-do (KR); Backman Kim, Gyeonggi-do (KR); Kwangsik Yang, Gyeonggi-do (KR); Wonku Yeo, Gyeonggi-do (KR); Sunghyun Yoo, Gyeonggi-do (KR); Suhyun You, Gyeonggi-do (KR); Seokho Lee, Gyeonggi-do (KR); Hwanju Jo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/868,058

(22) Filed: May 6, 2020

(65) Prior Publication Data
US 2020/0264656 A1    Aug. 20, 2020

Related U.S. Application Data

(63) Continuation of application No. 16/278,980, filed on Feb. 19, 2019, now Pat. No. 10,684,659.

(30) Foreign Application Priority Data

Feb. 21, 2018    (KR) .................. 10-2018-0020721

(51) Int. Cl.
| | | |
|---|---|---|
| *G06F 1/16* | (2006.01) | |
| *H05K 5/00* | (2006.01) | |
| *H05K 7/00* | (2006.01) | |

(52) U.S. Cl.
CPC ............ *G06F 1/169* (2013.01); *G06F 1/1616* (2013.01); *G06F 1/1662* (2013.01)

(58) Field of Classification Search
CPC ...... G06F 1/169; G06F 1/1616; G06F 1/1662; G06F 1/1692; G06F 1/1613; G06F 1/1615; G06F 1/1684
(Continued)

(56) References Cited

U.S. PATENT DOCUMENTS 6,560,612 B1    5/2003    Yamada et al.
9,015,625 B2    4/2015    Kimura
(Continued)

FOREIGN PATENT DOCUMENTS

CN    203241885 U    10/2013
EP    1691263 A1    8/2006
(Continued)

OTHER PUBLICATIONS

European Search Report dated Dec. 16, 2020.
(Continued)

*Primary Examiner* — Anthony M Haughton
(74) *Attorney, Agent, or Firm* — Cha & Reiter, LLC

(57) ABSTRACT

An electronic device according to an embodiment of the present disclosure may include: a housing including a first plate and a second plate, wherein the first plate includes an opening; a display panel at least partially exposed through the opening and including a touch sensor; a first support member coupled to the display panel and a portion of the first plate along at least part of one side of the opening; and a switch device configured to be actuated according to a depression of the display panel, the depression caused by a downward force exerted on an upper portion of the display panel. Other various embodiments are also possible.

21 Claims, 18 Drawing Sheets

(58) Field of Classification Search
USPC .............. 361/679.26–679.3, 679.55, 679.56
See application file for complete search history.

(56) References Cited

U.S. PATENT DOCUMENTS

| | | | |
|---|---|---|---|
| 9,542,016 B2* | 1/2017 | Armstrong-Muntner ................... G06F 3/042 | |
| 9,785,339 B2* | 10/2017 | Xie ....................... G06F 3/0488 | |
| 10,025,352 B1* | 7/2018 | Gault ................... H05K 5/0221 | |
| 10,228,721 B2* | 3/2019 | Farahani ................. G06F 1/169 | |
| 2004/0145862 A1 | 7/2004 | Hill et al. | |
| 2005/0052425 A1* | 3/2005 | Zadesky ................. G06F 3/041 345/173 | |
| 2008/0202824 A1* | 8/2008 | Philipp ................. G06F 3/0488 178/18.01 | |
| 2009/0174679 A1* | 7/2009 | Westerman ......... G06F 3/04883 345/173 | |
| 2010/0079404 A1* | 4/2010 | Degner ................... G06F 1/169 345/174 | |
| 2010/0139990 A1* | 6/2010 | Westerman ......... G06F 3/03543 178/18.03 | |
| 2011/0193813 A1 | 8/2011 | Gralewski et al. | |
| 2016/0370910 A1 | 12/2016 | Park et al. | |
| 2017/0060241 A1* | 3/2017 | Matsumoto ........... G06F 3/0416 | |
| 2017/0068346 A1 | 3/2017 | Hotelling et al. | |
| 2018/0113600 A1* | 4/2018 | Seymour ............. G06F 3/04847 | |
| 2019/0073003 A1* | 3/2019 | Xu ......................... H01H 13/83 | |
| 2019/0250666 A1* | 8/2019 | Klein .................... G06F 3/0393 | |
| 2020/0133336 A1* | 4/2020 | Wang .................... G06F 1/1616 | |

FOREIGN PATENT DOCUMENTS

| | | |
|---|---|---|
| JP | 2006-120550 A | 5/2006 |
| JP | 2010-108277 A | 5/2010 |
| JP | 2011-248439 A | 12/2011 |
| KR | 10-2007-0110352 A | 11/2007 |
| KR | 10-2009-0002648 A | 1/2009 |
| KR | 10-2009-0115831 A | 11/2009 |
| KR | 10-2011-0079828 A | 7/2011 |
| KR | 10-2013-0083912 A | 7/2013 |
| KR | 10-2016-0149941 A | 12/2016 |
| WO | 2010/016717 A2 | 11/2010 |
| WO | 2012/054128 A1 | 4/2012 |

OTHER PUBLICATIONS

Korean Search Report dated Jan. 19, 2022.
Notice of Patent Grant dated Mar. 24, 2022.
Indian Search Report dated Apr. 11, 2022.

* cited by examiner

ELECTRONIC DEVICE COMPRISING DISPLAY WITH SWITCH

CROSS REFERENCE TO RELATED APPLICATION(S)

This application is a Continuation of Ser. No. 16/278,980 filed on Feb. 19, 2019 which claims priority under 35 U.S.C. § 119 to Korean Patent Application No. 10-2018-0020721, filed on Feb. 21, 2018, in the Korean Intellectual Property Office, the disclosure of which is incorporated by reference herein in its entirety.

BACKGROUND

Field

Embodiments of the present disclosure generally relate to an electronic device including a display with a switch.

Description of Related Art

Personal Computers (PC) support Graphical User Interfaces (GUIs) which allow the user to input a command by clicking on an icon and/or menu displayed on a display. This can be contrasted with command line interfaces, where commands are inputted via character input through a keyboard. GUIs are often thought of as more intuitive and more convenient to the user.

In general, a portable electronic device (e.g., a laptop computer) may include a touchpad that is integrated within the portable electronic device. The touchpad allows user manipulation of a pointer displayed at a specific position in the display.

SUMMARY

As technology develops, electronic devices may provide the user with a variety of content, and as such, it may be desirable for the display area of the electronic device to be maximized. According to an embodiment of the present disclosure, it is intended to provide an electronic device with an additional display in addition to the main display.

Additional aspects will be set forth in part in the description which follows and, in part, will be apparent from the description, or may be learned by practice of the presented embodiments.

An electronic device according to an embodiment of the present disclosure may include: a housing including a first plate and a second plate, wherein the first plate includes an opening; a display panel at least partially exposed through the opening and including a touch sensor; a first support member coupled to the display panel and a portion of the first plate along at least part of one side of the opening; and a switch device configured to be actuated according to a depression of the display panel, the depression caused by a downward force exerted on an upper portion of the display panel.

An electronic device according to an embodiment of the present disclosure may include: a first housing including a first display panel; and a second housing pivotally coupled with the first housing and including a keyboard and a touchpad. The touchpad may be disposed on a support portion, exposed through an opening of the second housing, and may include a touch sensor, a second display panel, and a switch device configured to be actuated according to a depression of the touchpad caused by a downward force exerted on the touchpad.

Electronic devices according to embodiments of the present disclosure can provide a touchpad in which click buttons are integrated and a display function is added. The added display function of the touchpad improves user experience.

Advantages acquired in the present disclosure are not limited to the aforementioned advantages. Other advantages not mentioned herein can be clearly understood by those skilled in the art to which the present disclosure pertains from the following descriptions.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
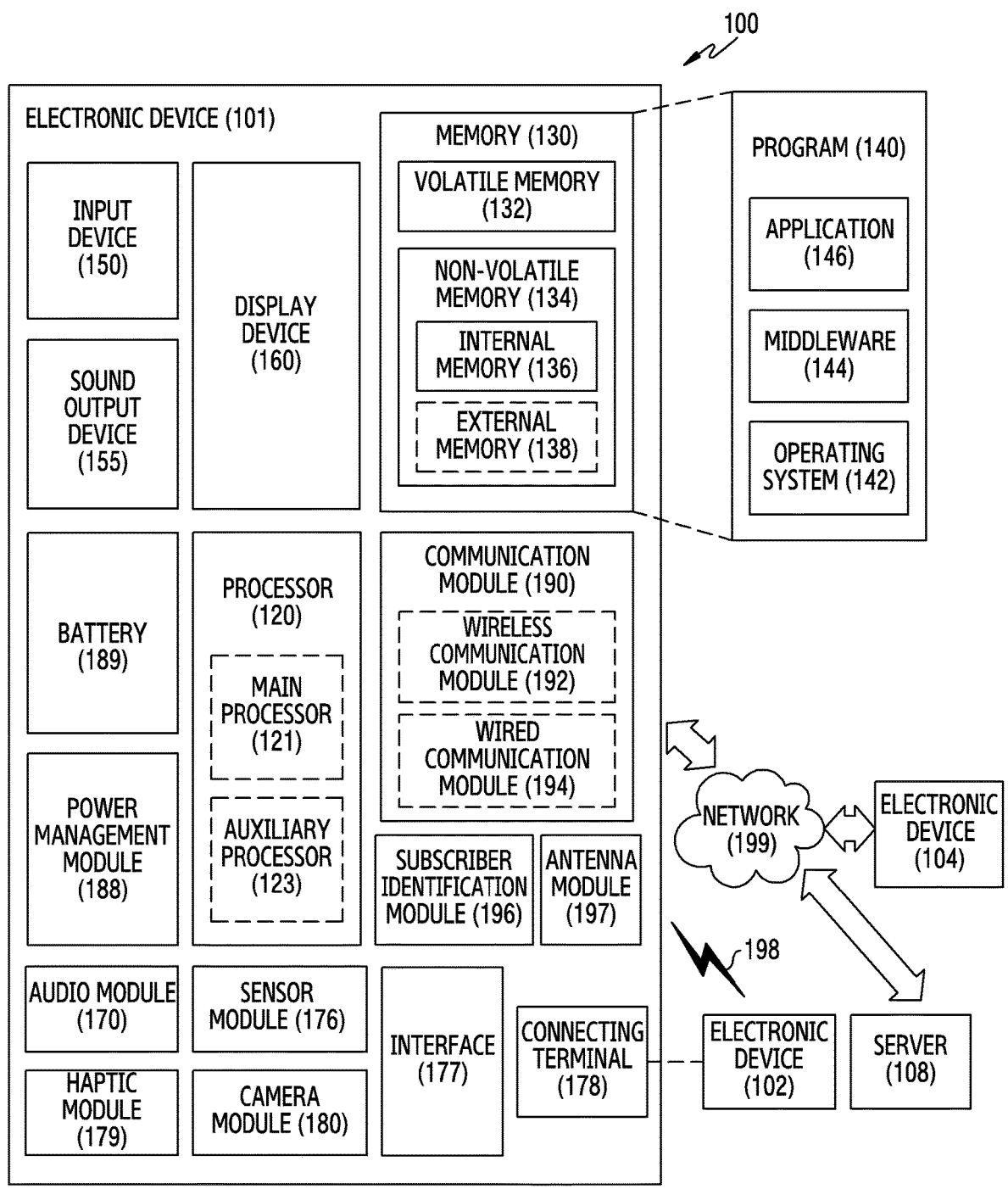
FIG. 1 is a block diagram of an electronic device in a network environment according to embodiments of the present disclosure.

Hereinafter, the present disclosure is described with reference to the accompanying drawings. It should be understood, however, that it is not intended to limit the present disclosure to the particular form disclosed, but, on the contrary, the present disclosure is to cover all modifications, equivalents, and alternatives falling within the spirit and scope of the present disclosure as defined by the appended claims. For example, for convenience of explanation, components may be exaggerated or reduced in size in the drawings. A size and thickness of each constitutional element shown in the drawings are arbitrarily shown for convenience of explanation, and thus the present disclosure is not necessarily limited thereto.

In addition, an orthogonal coordinate system is used herein, in which an x-axis may indicate a widthwise direction of an electronic device, a y-axis may indicate a lengthwise direction of the electronic device, and a z-axis may indicate a thickness direction of the electronic device. However, the x-axis, the y-axis, and the z-axis are not limited to three axes on the orthogonal coordinate system, and may be interpreted in a broad sense to include the orthogonal coordinate system. For example, the x-axis, the y-axis, and the z-axis may be orthogonal to each other, but may refer to different directions not orthogonal to each other. Like reference numerals denote like components throughout the drawings.

According to various embodiments of the present disclosure, an electronic device may include, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted-Device (HMD), electronic clothes, an electronic bracelet, an electronic necklace, an electronic appcessory, an electronic tattoo, a smart mirror, or a smart watch).

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
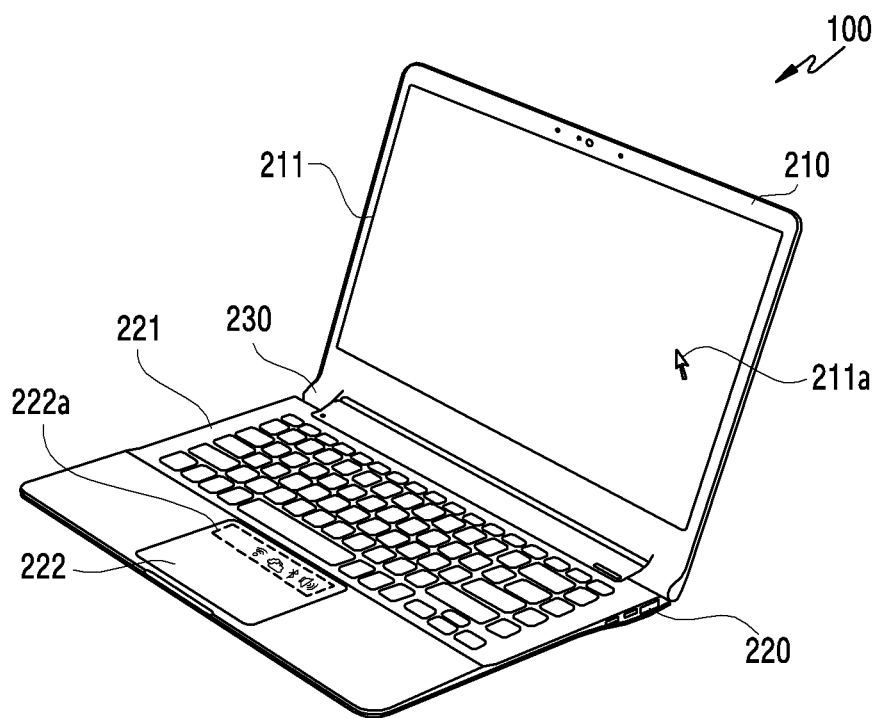
FIG. 2 is a perspective view illustrating an electronic device embedded with a touchpad with a switch according to an embodiment of the present disclosure.

FIG. 2 is a perspective view illustrating an electronic device embedded with a touchpad with a switch according to an embodiment of the present disclosure. The electronic device 101 may be any suitable computing device, such as a laptop computer, a desktop computer, a telephone, a smartphone, or a gaming device.

Referring to FIG. 2, the electronic device 101 according to an embodiment may include a first electronic device 210, a second electronic device 220, and a coupling portion 230 which couples the first and second electronic devices 210 and 220. The coupling portion 230 may mechanically or electrically couple the first and second electronic devices 210 and 220. For example, the coupling portion 230 may include a hinge structure by which the first and second electronic devices 210 and 220 are pivotally coupled. The first electronic device 210 may include a display 211. The second electronic device 220 may include a keyboard 221 and touchpad 222 which are disposed on the upper face of the second electronic device 220. Due to pivoting (or folding) of the coupling portion 230, the electronic device 101 may be manipulated into an open state in which the first electronic device 210 is at a specific angle with respect to the second electronic device 220 and a closed state in which the first electronic device 210 and the second electronic device 220 face each other. Therefore, the first electronic device 210 may be referred to as a main display portion or a lid portion, and the second electronic device 220 may be referred to as a main body portion. However, the embodiment is not limited thereto, and thus the electronic device 101 may have a configuration in which the display portion and the main body portion (e.g., the keyboard 221 and the touchpad 222) are integrated (i.e. without a coupling portion 230) or a configuration in which the display portion and the main body portion can be separated.

According to an embodiment, the display 211 may display various objects, content, and/or graphical user interfaces of various applications executed by the electronic device 210. The keyboard 221 and the touchpad 222 may function as input means for the user. For example, the user may input characters or the like by using the keyboard 221, and may move (or navigate) an input pointer 211a (or a cursor) displayed on the display 211 to select specific objects by using the touchpad 222. For this, the touchpad 222 according to an embodiment may include at least one sensor for detecting user inputs such as touch, drag, multi-touch, touch (e.g., a force touch) of a certain intensity, etc.

The touchpad 222 according to an embodiment of the present disclosure may display various objects, content, and/or graphic user interfaces of a specific application, apart from the display 211 included in the first electronic device 210. For this, the touchpad 222 according to an embodiment may include a display. For example, the touchpad 222 may display a status bar 222a which indicates various statuses of the electronic device 101. In some embodiments, the user may enter an input on the touchpad 222 to select, move, or otherwise control the object displayed on the touchpad 222.

The touchpad 222 according to an embodiment of the present disclosure may detect a depression or push input, in addition to touch input. In other words, the user may use the touchpad 222 as a button. The button function of the touchpad 222 may select an object displayed on the display 211 to open a file or a document, execute a command, start a program, browse a menu, and/or perform various other functions. The button function may correspond to various shortcuts so that the electronic device 101 can be more easily controlled. These shortcuts may be for functions such as zoom, scroll, moving the input pointer 211a to a specific position, input of a specific key (enter, delete, num lock key, etc.), or the like. To implement the button function, the touchpad 222 may include at least one switch that can be depressed, and may include support structures for the switch. The switch and support structures included in the touchpad 222 will be described below in greater detail.

Figure 3A:
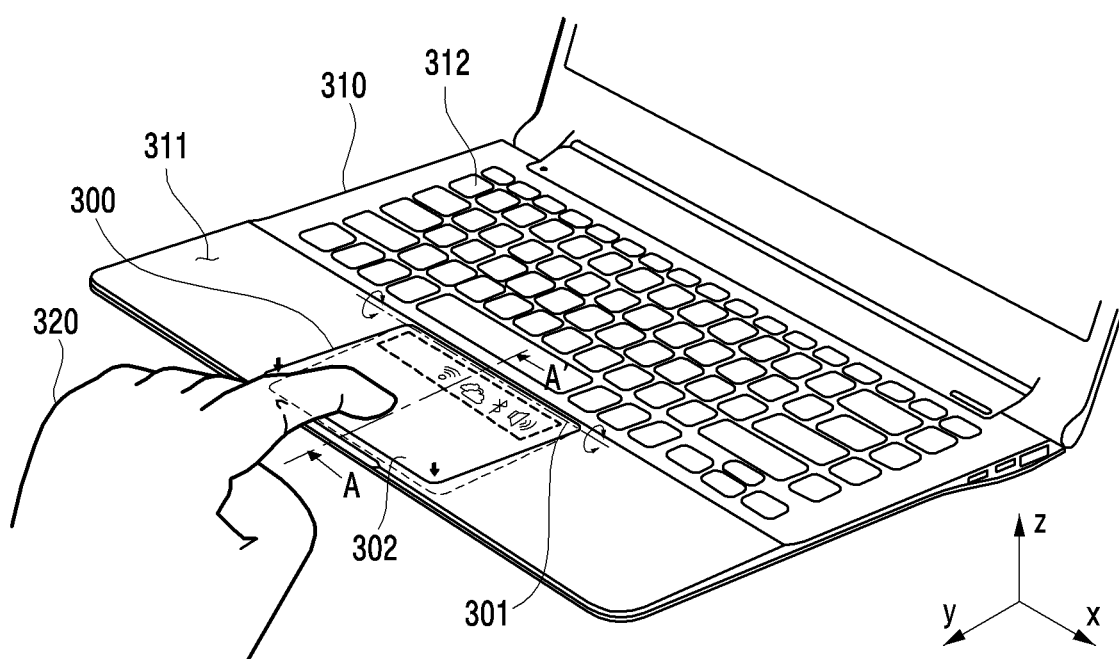
FIG. 3A and FIG. 3B are partial perspective views of touchpads of electronic devices according to two embodiments of the present disclosure.
Figure 3B:
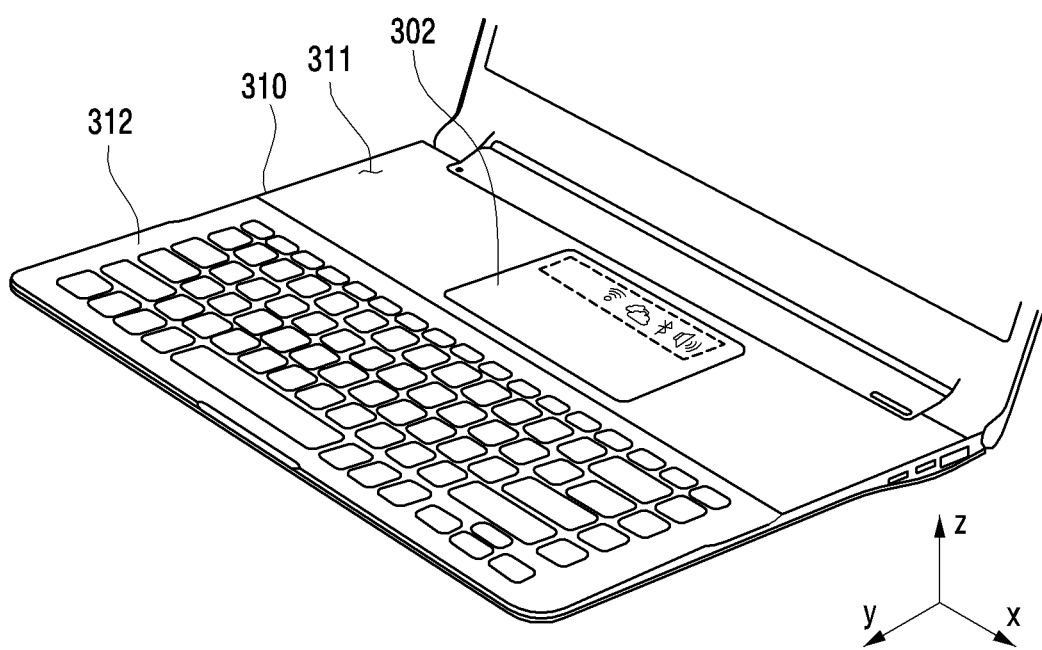

FIG. 3A and FIG. 3B are partial perspective views of touchpads of electronic devices according to two embodiments of the present disclosure. A touchpad 300 of FIG. 3 may be at least partially similar to the touchpad 222 of FIG. 2, and thus redundant descriptions thereof will be omitted. A push input for the touchpad 300 will be described with reference to FIG. 3A.

Referring to FIG. 3A, the touchpad 300 according to an embodiment may be disposed on an upper face 311 of a housing 310 of the electronic device 101. The housing 310 may be the main body portion (e.g., 220 of FIG. 2) of the electronic device. The touchpad 300 may be disposed on a central region below the keyboard 312 on the housing 310. According to another embodiment, as shown in FIG. 3B, the touchpad 300 may be disposed above the keyboard 312. However, the present disclosure is not limited thereto, and thus the touchpad 300 may be disposed at various locations on the upper face 311 of the housing 310.

According to an embodiment, the touchpad 300 may be configured to detect a touch input of a user 320 or to display various objects. In addition, the touchpad 300 may detect a push input of the user 320. For this, the touchpad 300 may be configured to move relative to the housing 310 (i.e. relative to the upper face 311 of the housing 310) when it is depressed by the user 320.

According to an embodiment, the touchpad 300 may be fixed to the housing 310 at one end portion 301. For example, the end portion 301 of the touchpad 300 may be at least partially fixedly coupled to the housing 310 along a horizontal direction (shown in FIG. 3A as the x-axis). The other end portion 302 opposite to the end portion 301 of the touchpad 300 may be free, i.e. it may not be fixed to the housing 310. When a region adjacent to the other end portion 302 of the touchpad 300 is depressed, the touchpad 300 may move downward along a depth direction (z-axis) with respect to the upper face 311 of the housing 310. In this case, the touchpad 300 may be tilted about the x-axis. When the touchpad 300 moves, it or structures supporting the touchpad 300 may be deformed (e.g. pivoted or bent).

In some embodiments, together with the end portion 301 of the touchpad 300, at least part of a side end portion of the touchpad 300 may be fixed to the housing 310 along a vertical direction (y-axis). In this case, when it is depressed, the touchpad 300 may be tilted (or bent) about an axis corresponding to the position at which the fixing of the touchpad 300 to the housing 310 ends.

Figure 4:
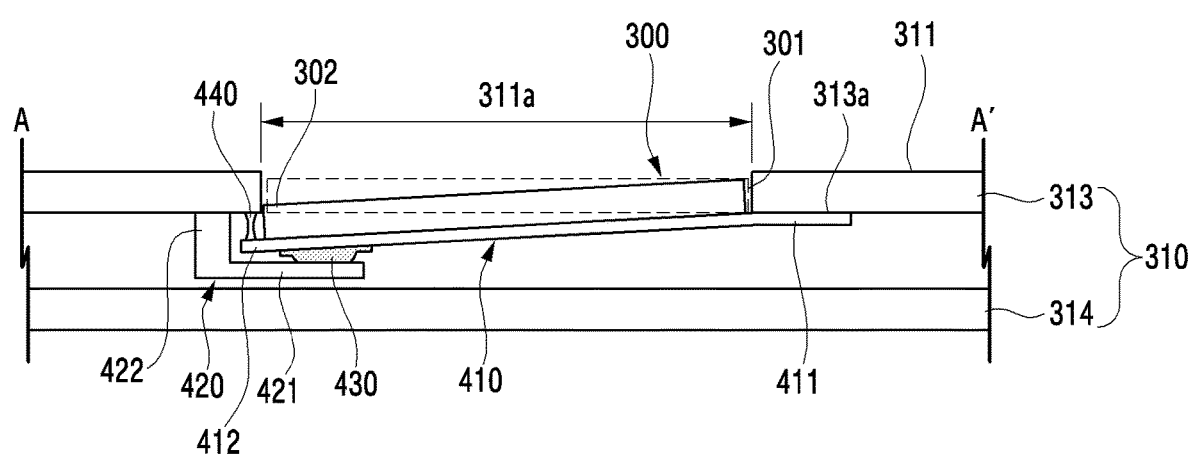
FIG. 4 is a cross-sectional view of the touchpad of FIG. 3A, cut along the line A-A'.
Figure 5:
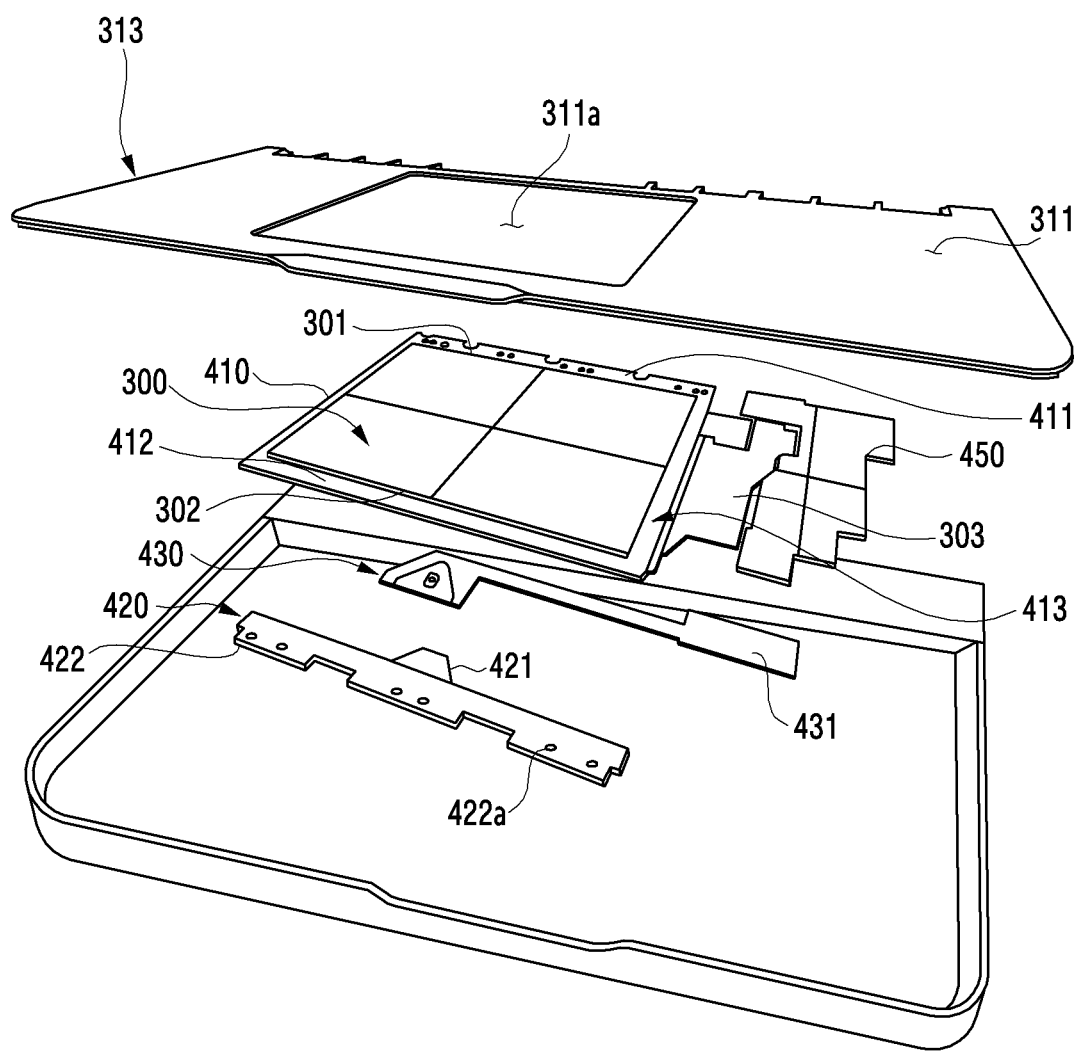
FIG. 5 is an exploded perspective view of a touchpad and a housing according to an embodiment of the present disclosure.
Figure 6:
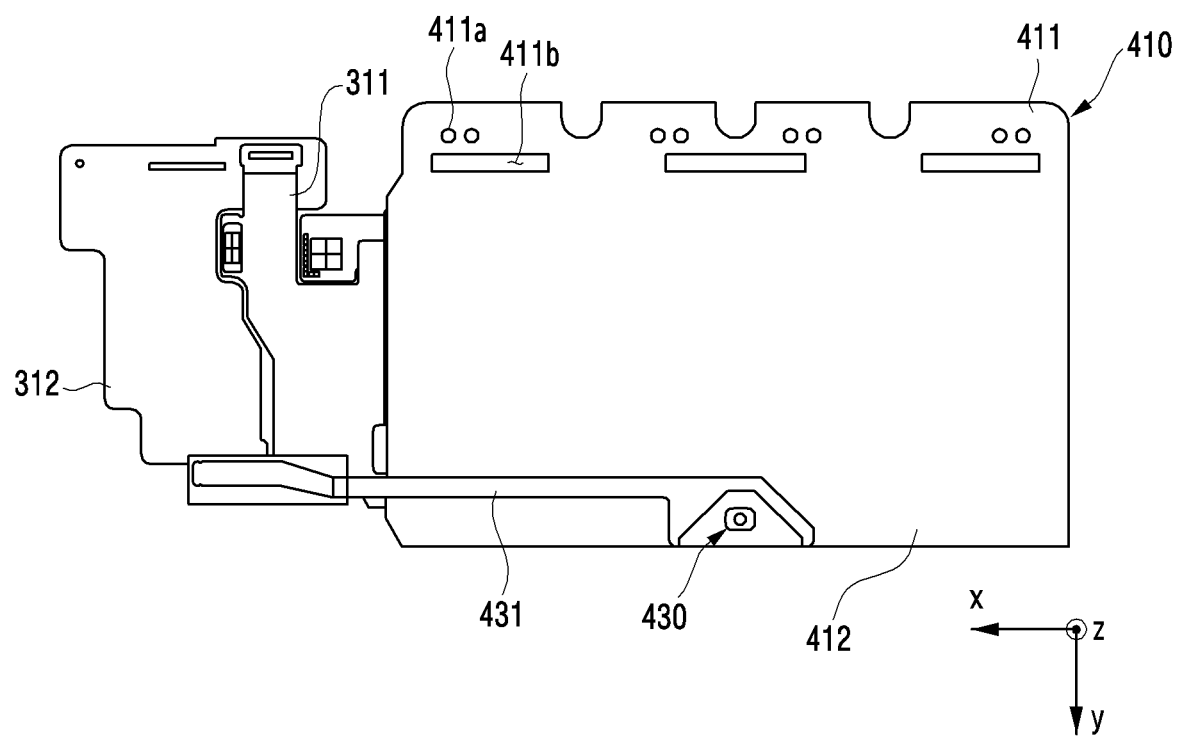
FIG. 6 is a rear plan view of a touchpad according to an embodiment of the present disclosure.

FIG. 4 is a cross-sectional view of the touchpad of FIG. 3A, cut along the line A-A'. FIG. 5 is an exploded perspective view of the touchpad and housing of FIG. 3A. FIG. 6 is a rear plan view of the touchpad of FIG. 3A. The mechanism in which a switch 430 operates due to movement caused by pushing the touchpad 300 will be described with reference to FIG. 4 to FIG. 6.

Referring to FIG. 4 to FIG. 6, the touchpad 300 according to an embodiment may be disposed on the upper face 311 of the housing 310. The housing 310 may include a front plate 313 and a rear plate 314. The housing 310 may be constructed by assembling the front plate 313 and the rear plate 314. The front plate 313 may include an opening 311a corresponding to the region in which the touchpad 300 is disposed. In other words, the touchpad 300 may be exposed through the opening 311a.

According to an embodiment, the touchpad 300 may be coupled to the front plate 313 via a coupling member 410. The touchpad 300 may be attached to the coupling member 410. The coupling member 410 may be fixedly coupled to the front plate 313 at the end portion 301 of the touchpad 300. For example, one end portion 411 of the coupling member 410 may be fixedly coupled to a lower portion 313a of the front plate 313. The coupling may be achieved through adhesives, screw joining, ultrasonic welding, or the like. Referring to FIG. 6, the end portion 411 of the coupling member 410 according to an embodiment may include at least one hole 411a to facilitate coupling with the housing 310. For example, screws may be inserted into holes 411a. On the other hand, the other end portion 412 of the coupling member 410 may not be fixed to the housing 310. The other end portion 412 may move freely with respect to the housing 310. The other end portion of the touchpad 300 (or the other end portion 412 of the coupling member 410) may include the switch 430 to implement a button function. The switch 430 may include a dome switch, a tactile switch, or a multi-input switch.

According to an embodiment, a support member 420 may function as a support to facilitate operations of the switch 430. As shown in FIG. 4, the support member 420 may include a support portion 421 corresponding to the switch 430 and a coupling portion 422 for coupling the support member 420 to the housing 310. The coupling portion 422 may be fixedly coupled to the front plate 313. The switch 430, when the touchpad is depressed, may come into contact with the support portion 421 so as to actuate the switch 430.

According to an embodiment, the other end portion 302 of a touchpad 400, which is free to move in relation to the housing 310, may move downward along a depth direction (z-axis). In this case, the end portion 301 of the touchpad 300 is fixed to the housing 310 by means of the coupling member 410 and thus may function as a pivot axis for the movement of the touchpad 400. The movement of the touchpad 300 may be accompanied by deformation such as bending of the touchpad 300 and/or the coupling member 410. Referring to FIG. 6, the coupling member 410 according to an embodiment may include at least one slit or opening 411b at locations adjacent to the end portion 411. The slit 411b facilitates pivoting (or deformation) of the coupling member 410.

In addition to performing switching actuation or button actuation operations, the switch 430 according to an embodiment may provide a restoring force in a direction opposite to the push direction. To this end, the switch 430 may include an elastic material for providing the restoring force. The restoring force may be generated when, for example, the dome switch of the switch 430 flattened by the pushing is restored back to its original shape. In another example, if the switch 430 is a tactile switch, the restoring force may be generated by a spring included in the switch 430. The restoring force may also be generated by the touchpad 300 and/or the coupling member 410, i.e. the touchpad 300 and/or the coupling member 410 may have elastic properties. Accordingly, at least part of the touchpad 300 may move from a first position (the normal position) to a second position (the depressed position) when the touchpad 300 is depressed by the user, and may move back from the second position to the first position by the restoring force of the switch 430, the touchpad 300, and the coupling member 410. Such movement of the touchpad 300 may be referred to one click action. Through the one click action, the user may be provided with click or detent feedback confirming that a button push is input.

According to an embodiment, the coupling member 410 has a greater area than the touchpad 300, and thus may include a flange 413, shown in FIG. 5. The flange 413 may include the one end portion 411 and the other end portion 412. The flange 413 may be caught in the front plate 313 to prevent the touchpad 300 from falling out of the opening 311a. As shown in FIG. 5, in addition to the one end portion 411 and the other end portion 412, the flange 413 may further include additional flanges at the other two sides of the touchpad 300.

According to an embodiment, a sealing member 440 may be constructed between the flange 413 and the front plate 313. The sealing member 440 may protect internal components from contamination and moisture infiltration through the gap between the touchpad 300 and the housing 310. The sealing member 440 may provide aesthetic satisfaction to the user by filling a space or gap between the touchpad 300 and the front plate 313 of the housing 310.

Referring to FIG. 5, the touchpad 400 and switch 430 according to an embodiment may be electrically coupled to at least one processor (e.g., the processor 120 of FIG. 1) by using at least one Flexible Printed Circuit Board (FPCB). For example, the touchpad 400 and the switch 430 may be coupled to a main PCB or sub PCB on which the at least one processor is mounted.

The touchpad 400 according to an embodiment may be coupled to a display driving circuit and a touch detection circuit by using a first PCB 303. The display driving circuit and the touch detection circuit may be driven such that the touchpad 300 can display content or objects, and can detect various inputs such as touch, hovering input, input using a stylus pen, etc. In some embodiments, the display driving circuit and the touch detection circuit may be implemented as one or more chips which are mounted on the first PCB 303. The switch 340 according to an embodiment may be coupled to the main PCB or the sub PCB by using a second PCB 431. In some embodiments, the second PCB 431 may be coupled to the first PCB 303, and may be coupled to the main PCB or the sub PCB via the first PCB 303.

Figure 7:
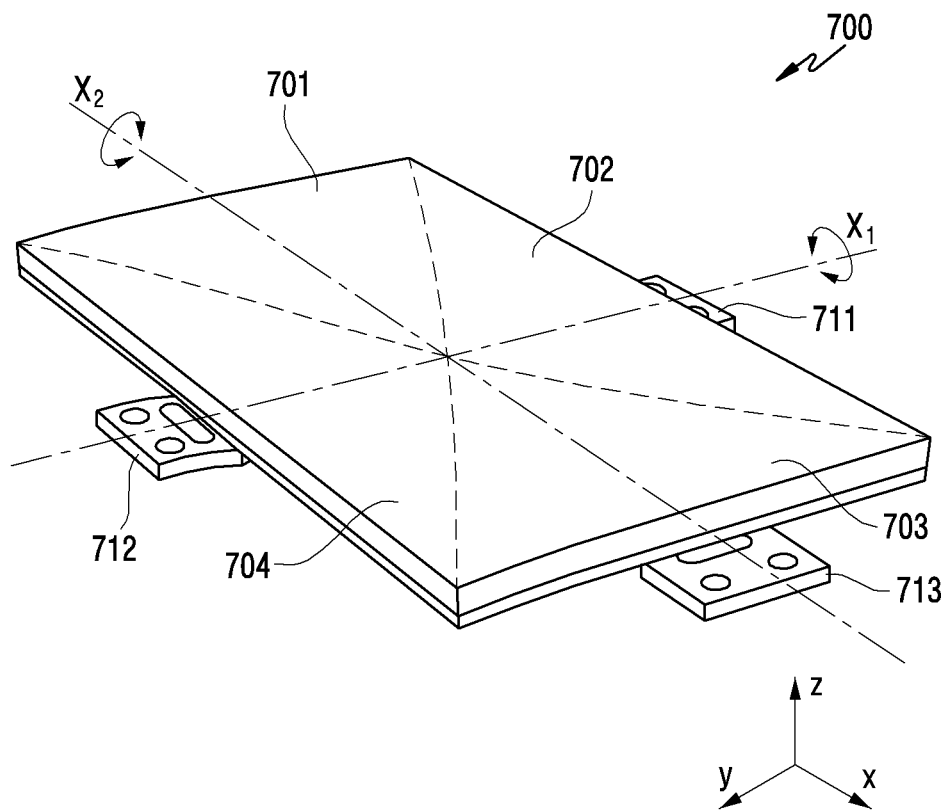
FIG. 7 is a partial perspective view of a touchpad of an electronic device according to an embodiment of the present disclosure.
Figure 8:
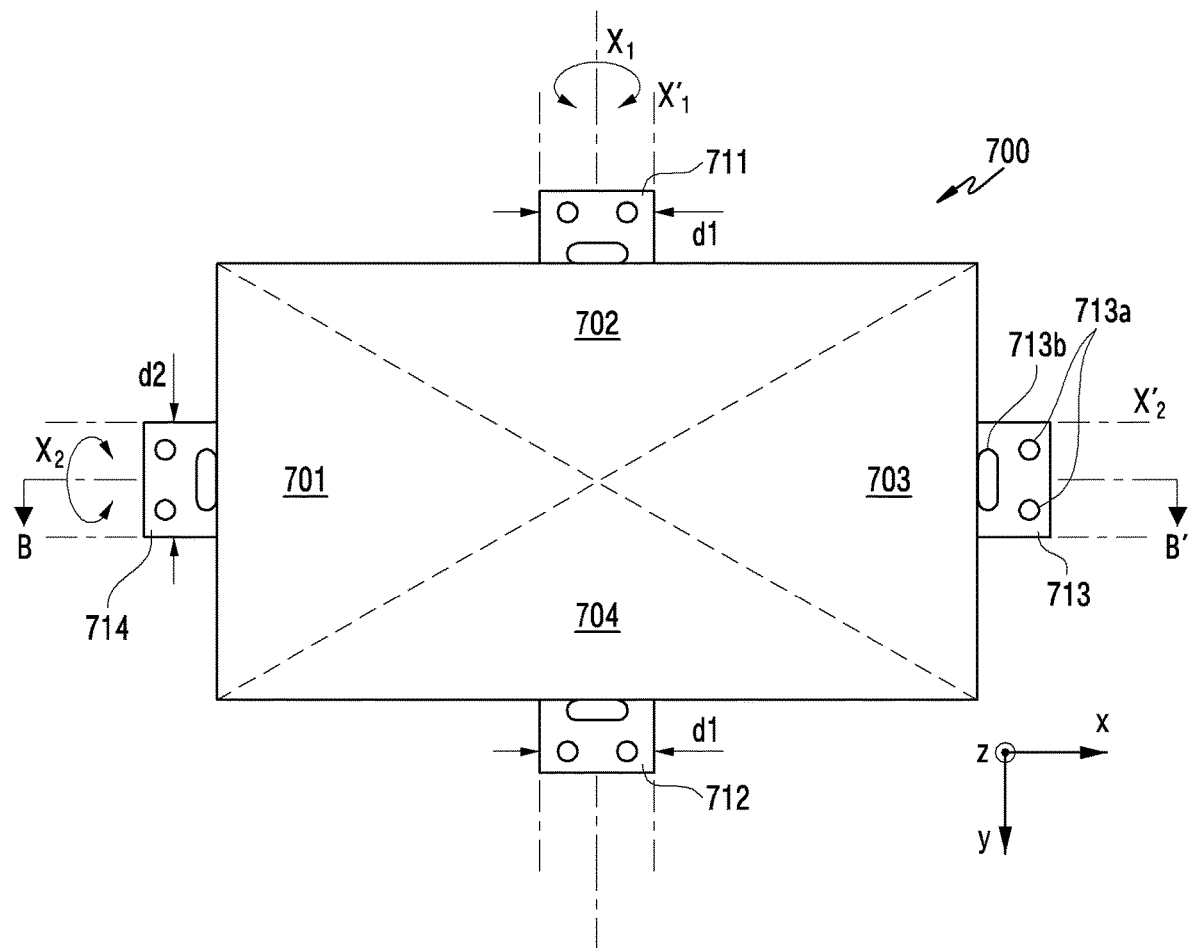
FIG. 8 is an upper plan view of the touchpad of FIG. 7.
Figure 9:
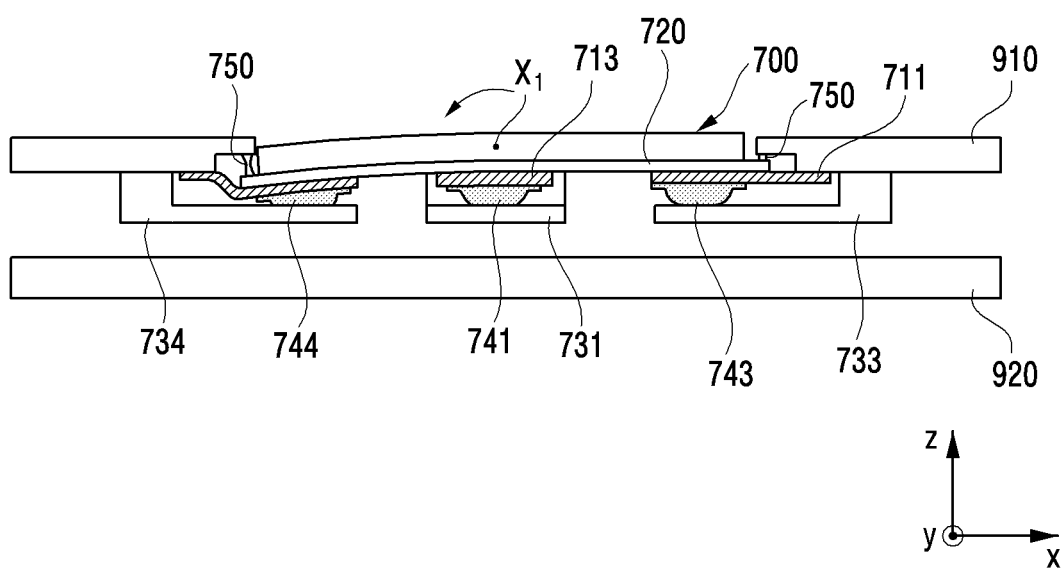
FIG. 9 is a cross-sectional view of the touchpad of FIG. 8, cut along line B-B'.

FIG. 7 is a partial perspective view of a touchpad of an electronic device according to an embodiment of the present disclosure. FIG. 8 is a plan view of the touchpad of FIG. 7. FIG. 9 is a cross-sectional view of the touchpad of FIG. 8, cut along line B-B'. A touchpad 700 of FIG. 7 to FIG. 9 may be at least partially similar to the touchpad 222 of FIG. 2, and thus redundant descriptions thereof will be omitted. A push input for the touchpad 700 will be described with reference to FIG. 7.

Referring to FIG. 7, the touchpad 700 according to an embodiment may be divided into a plurality of independent and spatially separated button regions 701 to 704. The button regions 701 to 704 may be regions of the touchpad 700 which are movable by the user to implement individual and separate button functions. According to an embodiment, the touchpad 700 may include four button regions, that is, the first button region 701, the second button region 702, the third button region 703, and the fourth button region 704.

According to an embodiment, the touchpad 700 may be coupled to a front plate 910 included in a housing by means of at least one coupling member. For example, a first coupling member 711 may be fixedly coupled to the touchpad 700 at a portion corresponding to the second button region 702. A second coupling member 712 may be fixedly coupled to the touchpad 700 at a portion corresponding to the fourth button region 704. A third coupling member 713 may be fixedly coupled to the touchpad 700 at a portion corresponding to the third button region 703. A fourth coupling member 714 may also be fixedly coupled to the touchpad 700 at a portion corresponding to the first button region 701. The coupling members 711 to 714 may be fixedly coupled to the portions of the front plate 910 adjacent to the sides of the touchpad 700. The fixed coupling may be achieved through adhesives, screw joining, ultrasonic welding, or the like. For this, in some embodiments, each of the coupling members 711 to 714 may include a coupling means so as to be fixedly coupled with the housing (i.e. the front plate 910). For example, the third coupling member 713 may include at least one opening 713*a* for screw joining.

According to an embodiment, the touchpad 700 may be movable with respect to the front plate 910 to enable push inputs for each of the button regions 701 to 704. In this case, the coupling members 711 to 714 may provide restoring forces for the push inputs, and may provide axes of bending or pivoting.

For example, when the third button region 703 is pushed, the portion of the touchpad 700 corresponding to the third button region 703 may move downward along a depth direction (z-axis). In this case, the touchpad 700 may pivot about a first axis X1 which traverses the first coupling member 711 and second coupling member 712. In other words, the touchpad 700 may be bent with respect to the first axis X1. A movement of the touchpad 700 may include deformation such as bending or twisting of the touchpad 700, the first coupling member 711, and/or second coupling member 712. In addition, when the third button region 703 moves downward, the first button region 701 opposite thereto may move upward, and deformation may occur in the fourth coupling member 714 by which the first button region 701 is coupled to the housing. In another example, a push input for the fourth button region 704 may cause a downward movement of the touchpad 700 corresponding to the fourth button region 704. In this case, the touchpad 700 may be bent with respect to a second axis X2 which transverses the third coupling member 713 and the fourth coupling member 714.

Referring to FIG. 8, a movement of each of the button regions 701 to 704 may be with respect to an axis that is substantially parallel to a central axis of the touchpad 700, and may be achieved based on a point at which the coupling between the coupling members 711 to 714 and the housing ends. For example, a push input for the third button region 703 may cause pivoting or deformation of the touchpad 700 with respect to the axis X1' which is parallel to the first axis X1 but is based on where the coupling between the coupling member 711 and the housing ends. In another example, a push input for the second button region 702 may cause pivoting or deformation of the touchpad 700 with respect to the axis X2' which is parallel to the second axis X2 but is based on where the coupling between the coupling member 713 and the housing ends. The above-mentioned movement of each of the button regions 701 to 704 may include pivoting, deformation, twisting, etc. In some embodiments, the coupling members 711 to 714 may include at least one opening 713*b* to facilitate deformation of the touchpad 700.

The coupling members 711 to 714 according to an embodiment may have a specific width. For example, the second coupling member 712 may have a first width d1, and the fourth coupling member 714 may have a second width d2. The widths of the coupling members 711 to 714 may depend on the horizontal and vertical lengths of the touchpad 700. Stiffness in which the touchpad 700 is fixed to the housing and/or resistance for the movements and deformations of the touchpad 700 may vary depending on the widths of the coupling members 711 to 714. The amount of click feel and/or tactile feedback provided to the user in turn may depend on the stiffness and the resistance.

Referring to FIG. 9, support members 731, 733, and 734 according to an embodiment may function as supports for click actions of switches 741, 743, and 744 coupled to the touchpad 700. When depressed, the switches 741, 743, and 744 may come into contact with the support members 731, 733, and 734 so as to actuate the switches 741, 743, and 744. For example, the first support member 731 may be coupled to the front plate 910 at a position corresponding to the first switch 741. The third support member 733 may be coupled to the front plate 910 at a position corresponding to the third switch 743, and the fourth support member 734 may be coupled to the front plate 910 at a position corresponding to the fourth switch 744. Although not shown in FIG. 9, a second support member may be coupled to the front plate 910 at a position corresponding to the second switch.

Figure 10:
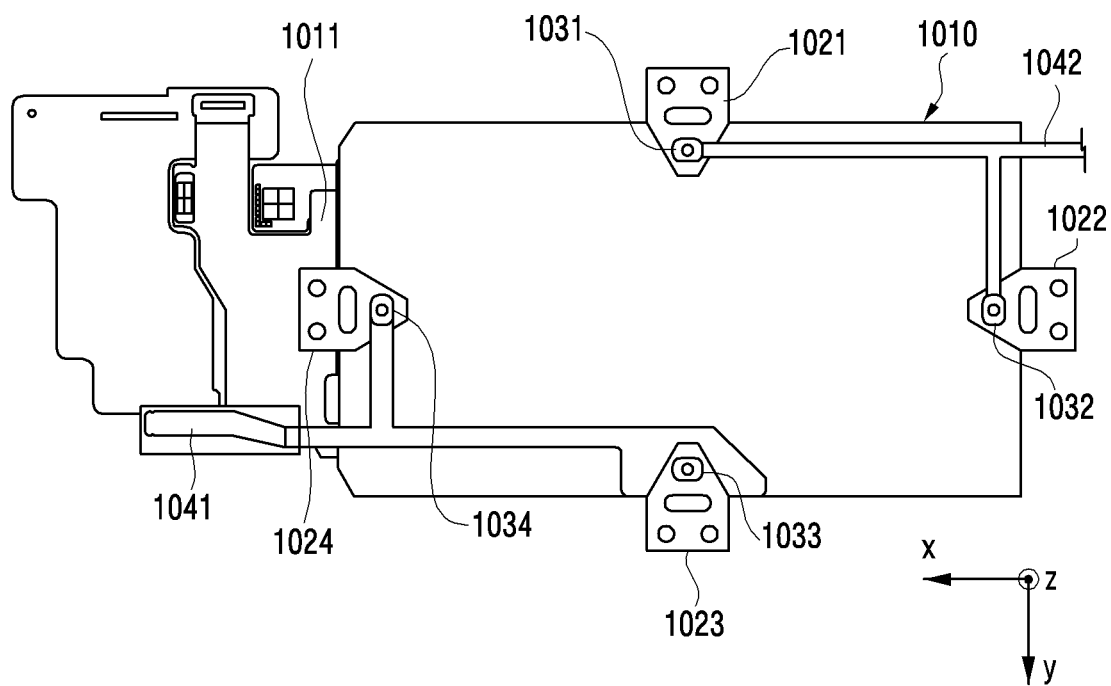
FIG. 10 is a rear plan view of a touchpad according to an embodiment of the present disclosure.

FIG. 10 is a rear plan view of a touchpad according to an embodiment of the present disclosure.

Referring to FIG. 10, a touchpad 1010 (or a support member, such as the support portion 720 of FIG. 9) according to an embodiment may include coupling members 1021 to 1024 disposed at edges of the touchpad 1010. For example, the first coupling member 1021 and the third coupling member 1023 may be fixedly coupled to the touchpad 1010 at the edges facing each other. The second coupling member 1022 and the fourth coupling member 1024 may be fixed to the touchpad 1010 at the edges facing each other, so as to be substantially perpendicular to an axis in which the first coupling member 1021 and the third coupling member 1023 are disposed. The coupling members 1021 to 1024 may respectively include switches 1031 to 1034. According to an embodiment, the touchpad 1010 and the switches 1031 to 1035 may be electrically or operatively coupled to at least one processor (e.g., the processor 120 of FIG. 1) via at least one FPCB. For example, the touchpad 1010 may be coupled to a display driving circuit and a touch detection circuit via a first PCB 1011. The display driving circuit and the touch detection circuit may be driven such that the touchpad 1010 can display contents and objects, and can detect various inputs. In some embodiments, the display driving circuit and the touch detection circuit may be implemented as one or more chips mounted on the first PCB 1011.

According to an embodiment, at least two switches may be coupled to a main PCB or a sub PCB via another PCB. For example, one end of a second PCB 1041 may be coupled to the main PCB or the sub PCB. The other end opposite to the one end of the second PCB 1041 may be electrically or operatively coupled to the third switch 1033 and the fourth switch 1034. To accomplish this, the second PCB 1041 may include extended branches that extend to the third switch 1033 and the fourth switch 1034. Accordingly, the third switch 1033 and the fourth switch 1034 may be mounted on the second PCB 1041. In addition, one end of a third PCB 1042 may be coupled to the main PCB or the sub PCB. The other end opposite to the one end of the third PCB 1042 may be electrically or operatively coupled to the first switch 1031 and the second switch 1032. The third PCB 1042 may include extended branches that extend to the first switch 1031 and the second switch 1032.

Figure 11:
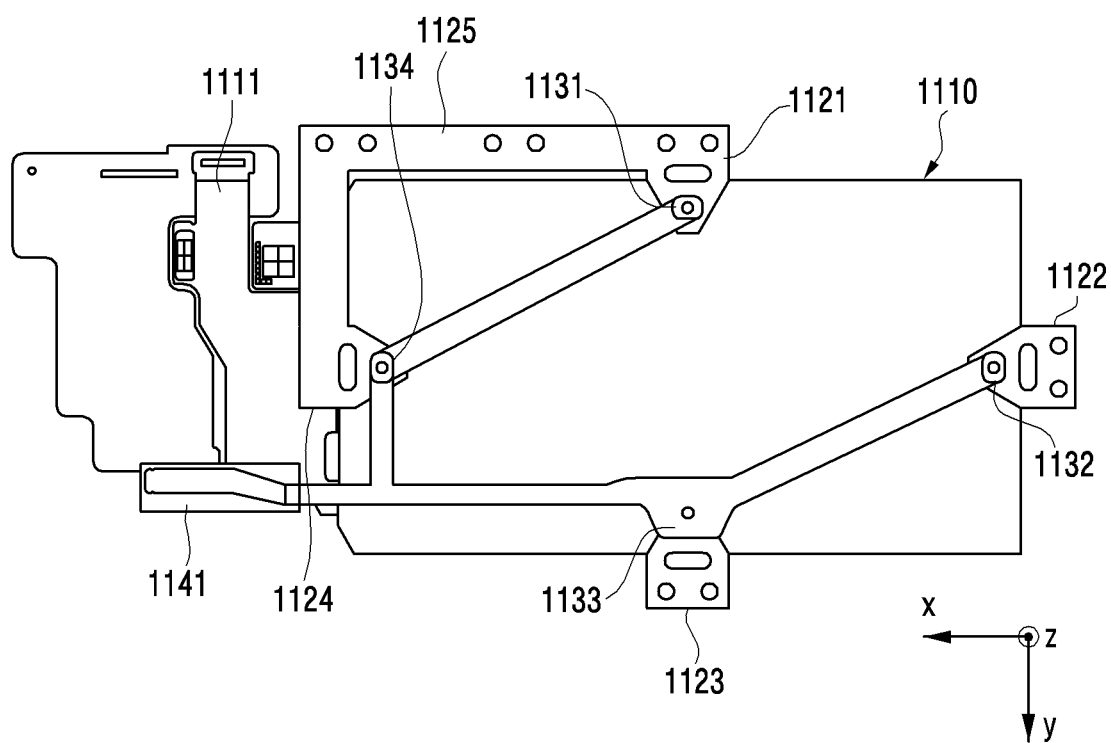
FIG. 11 is a rear plan view of a touchpad according to another embodiment of the present disclosure.

FIG. 11 is a rear plan view of a touchpad according to another embodiment of the present disclosure.

Referring to FIG. 11, a touchpad 1110 (or a support member, such as the support portion 720 of FIG. 9) according to an embodiment may include coupling members 1121 to 1124 disposed at edges of the touchpad 1110. For example, the first coupling member 1121 and the third coupling member 1123 may be fixedly coupled to the touchpad 1110 at the edges facing each other. The second coupling member 1122 and the fourth coupling member 1124 may be fixed to the touchpad 1110 at the edges facing each other, so as to be substantially perpendicular to an axis in which the first coupling member 1121 and the third coupling member 1123 are disposed. The coupling members 1121 to 1124 may respectively include switches 1131 to 1134. In an embodiment, at least two coupling members may be coupled to each other. For example, the first coupling member 1121 and the fourth coupling member 1124 may be coupled by means of a coupling portion 1125. Thus, the first coupling member 1121, the fourth coupling member 1124, and the coupling portion 1125 may be integrated. The first coupling member 1121, the fourth coupling member 1124, and the coupling portion 1125 may be fixedly coupled to a housing (e.g., the front plate 910 of FIG. 9) at a portion in which the first coupling member 1121 is disposed. Accordingly, since the fourth coupling member 1124 is not fixedly coupled directly to the housing, when the touchpad 1110 is installed in the electronic device, by deforming the touchpad 1110, it is possible to access the first PCB 1111 from outside the electronic device.

According to an embodiment, the touchpad 1110 and the switches 1131 to 1135 may be electrically or operatively coupled to at least one processor (e.g., the processor 120 of FIG. 1) via at least one FPCB. For example, the touchpad 1110 may be coupled to a display driving circuit and a touch detection circuit via the first PCB 1111. The display driving circuit and the touch detection circuit may be driven such that the touchpad 1110 can display contents and objects, and can detect various inputs. In some embodiments, the display driving circuit and the touch detection circuit may be implemented as one or more chips mounted on the first PCB 1111.

According to an embodiment, all of the switches 1131 to 1134 coupled to the touchpad 1110 may be coupled to a main PCB or a sub PCB via another PCB. For example, one end of the second PCB 1141 may be coupled to the main PCB or the sub PCB, and the other end may be extended to be coupled to the switches 1131 to 1134.

Figure 12:
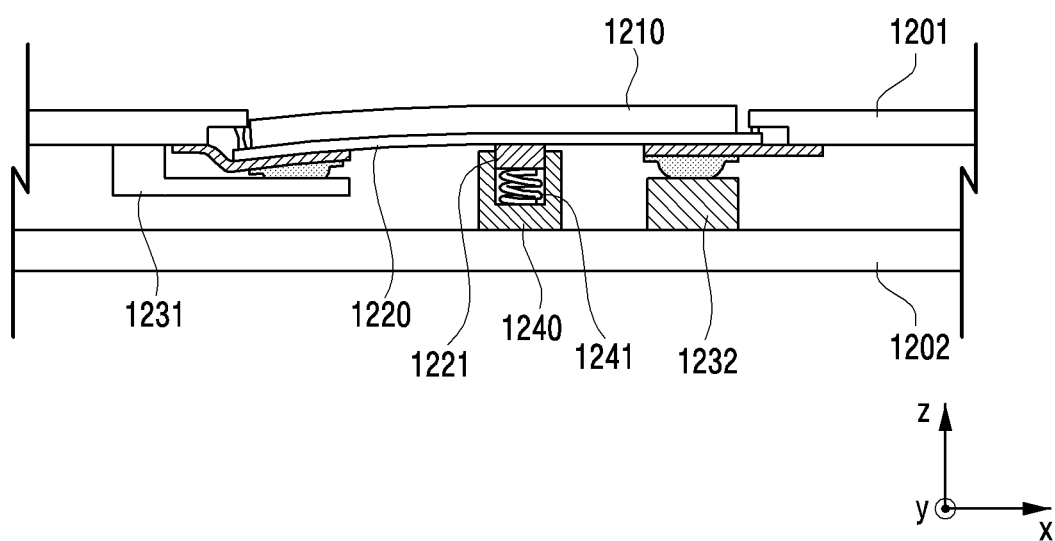
FIG. 12 is a cross-sectional view of an electronic device including a touchpad according to an embodiment of the present disclosure.

FIG. 12 is a cross-sectional view of an electronic device including a touchpad according to an embodiment of the present disclosure. Referring to FIG. 12, a touchpad 1210 according to an embodiment may be disposed in a housing including a front plate 1201 and a rear plate 1202. The touchpad 1210 may be disposed on a support portion 1220. At least one coupling member may be provided to mount the touchpad 1210 in the housing. According to an embodiment, in addition to the coupling members by which the touchpad 1210 and/or the support portion 1220 are fixedly coupled to the front plate 1210, a structure 1240 may be further included to support the touchpad 1201 and/or the support portion 1220 at a substantially central position thereof. The structure 1240 may be fixedly coupled to the rear plate 1202. The support portion 1220 may include a guide member 1221 in a vertical direction (the z-axis direction). According to an embodiment, the guide member 1221 may further include an elastic member 1241 which provides elastic force in the vertical direction. For example, the elastic member 1241 may include a spring, an air spring, a high-density sponge, or the like.

According to an embodiment, a switch included in the touchpad 1210 may be actuated by using at least one fixed support member, such as support members 1231 and 1232. The touchpad 1210 and the switch attached to the touchpad 1210 may move towards the fixed support member due to force applied by the user, and thus the switch may be actuated. According to an embodiment, the first support member 1231 may be fixedly coupled to the front plate 1201. In some embodiments, the second support member 1232 may be fixedly coupled to the rear plate 1202.

Figure 13:
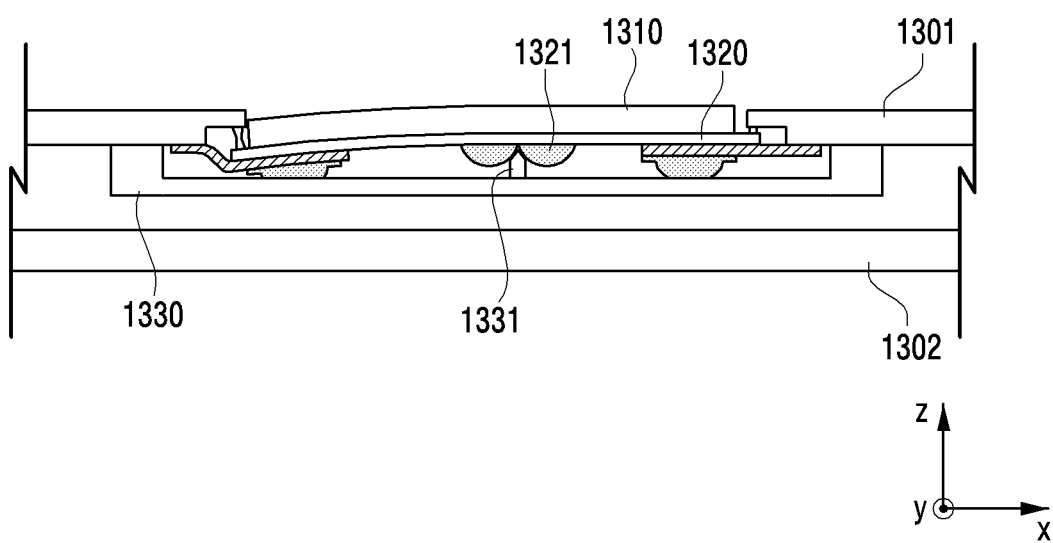
FIG. 13 is a cross-sectional view of an electronic device including a touchpad according to another embodiment of the present disclosure.

FIG. 13 is a cross-sectional view of an electronic device including a touchpad according to another embodiment of the present disclosure. Referring to FIG. 13, a touchpad 1310 according to an embodiment may be disposed in a housing including a front plate 1301 and a rear plate 1302. The touchpad 1310 may be disposed on a support portion 1320. At least one coupling member may be provided to mount the touchpad 1310 in the housing. According to an embodiment, in addition to coupling members by which the touchpad 1310 and/or the support portion 1320 are fixedly coupled to the front plate 1301, support structures 1321 and 1331 may be further included to support the touchpad 1310 and/or the support portion 1320 at a substantially central position thereof. The support structures 1321 and 1331 may include the groove member 1321 and the protrusion member 1331 corresponding to the groove member 1321. Since the protrusion member 1331 is accommodated in the groove member 1321, a movement and/or deformation for a click action of the touchpad 1310 may be achieved based on the groove member 1321 and the protrusion member 1331. According to an embodiment, the support member 1330 for a switch operation may be extended to up to a position at which the support structures 1321 and 1331 are disposed.

Figure 14:
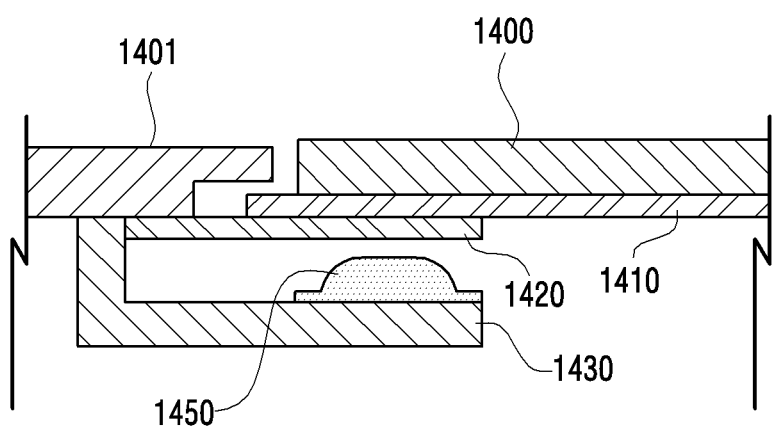
FIG. 14 is a cross-sectional view of a switch included in an electronic device according to an embodiment of the present disclosure.

FIG. 14 is a cross-sectional view of a switch included in an electronic device according to an embodiment of the present disclosure. According to an embodiment, a touchpad 1400 may be supported on a support portion 1410, and may be coupled to a housing 1401 (or a front plate) via a coupling member 1420. In some embodiments, a switch 1450 may be disposed on a support member 1430, instead of being disposed on a bottom surface of the touchpad 1400. The switch 1450 may be come into contact with the coupling member 1420 when the touchpad 1400 is depressed. The switch 1450 may further serve as a support so that the touchpad 1400 and the support portion 1410 are correctly located.

Figure 16:
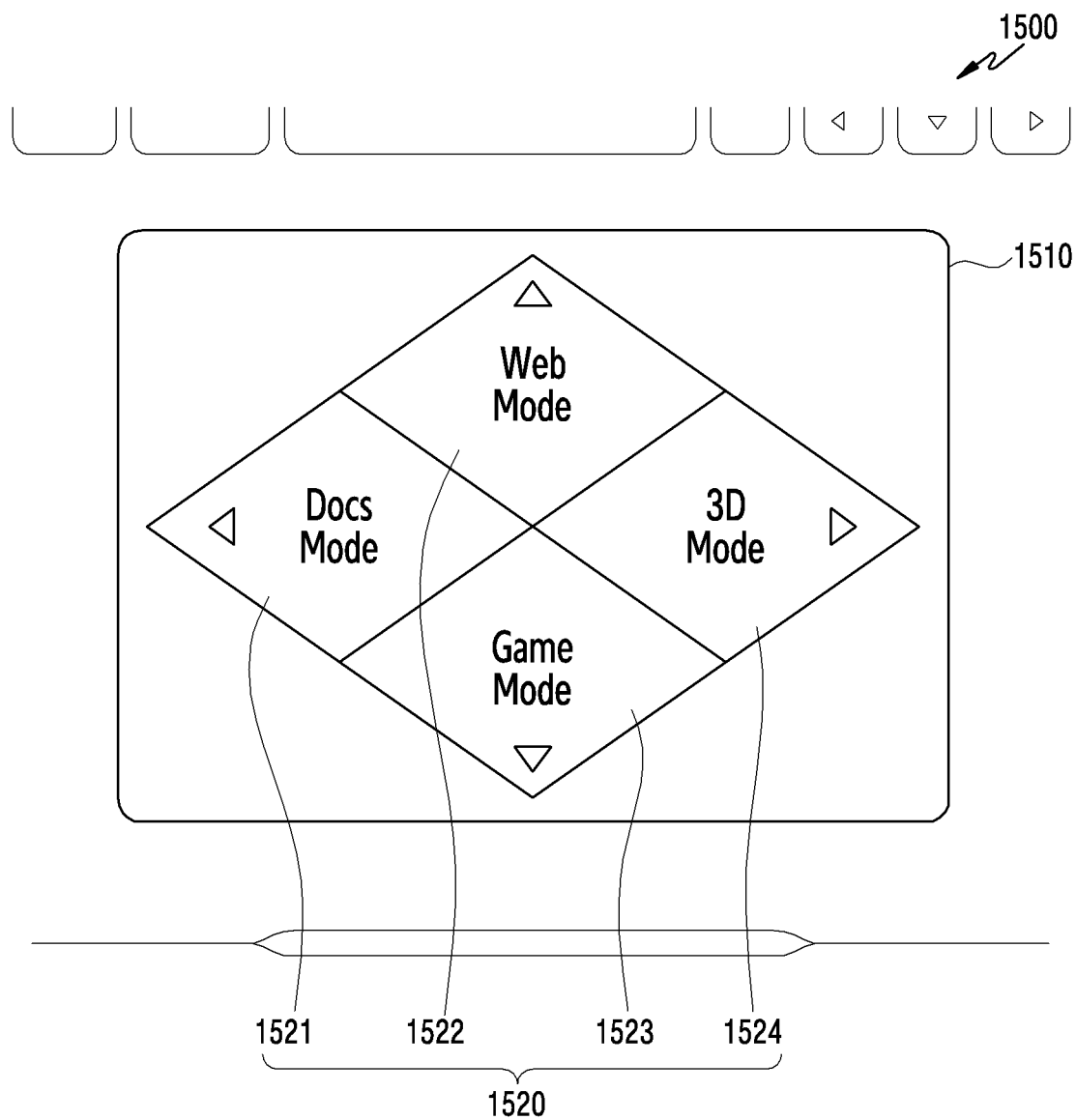
FIG. 16 is a plan view illustrating a Graphical User Interface (GUI) of a touchpad included in an electronic device according to an embodiment of the present disclosure.

FIG. 16 is a plan view illustrating a GUI of a touchpad included in an electronic device according to an embodiment of the present disclosure. Objects 1520 displayed on a touchpad 1510 according to an embodiment may be a GUI that enables the user to recognize various functions or modes of the electronic device 1500. For example, a click input for an upper portion 1522 of the object 1520 displayed on the touchpad 1510 may correspond to a web mode, a click input for a lower portion 1523 may correspond to a game mode, a click input for a left portion 1521 may correspond to a Docs mode, and a click input for a right portion 1524 may correspond to a 3D mode. In another embodiment, upper, lower, left, and right click inputs for the touchpad 1510 or the displayed object 1520 may correspond to upper, lower, left, and right key buttons of a keyboard.

Figure 15:
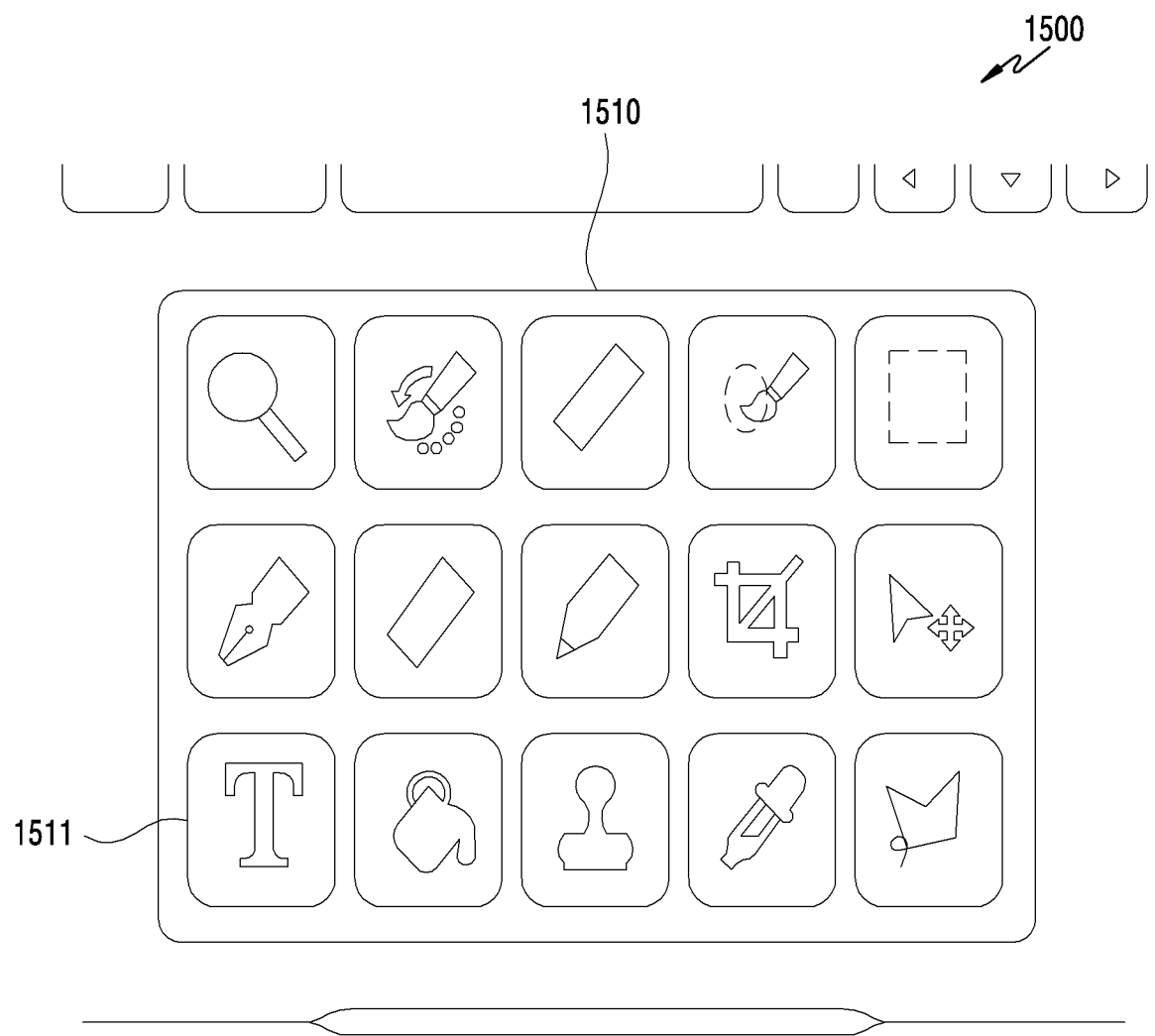
FIG. 15 and FIG. 17 are plan views illustrating GUIs of a touchpad included in an electronic device according to another embodiment of the present disclosure.
Figure 17:
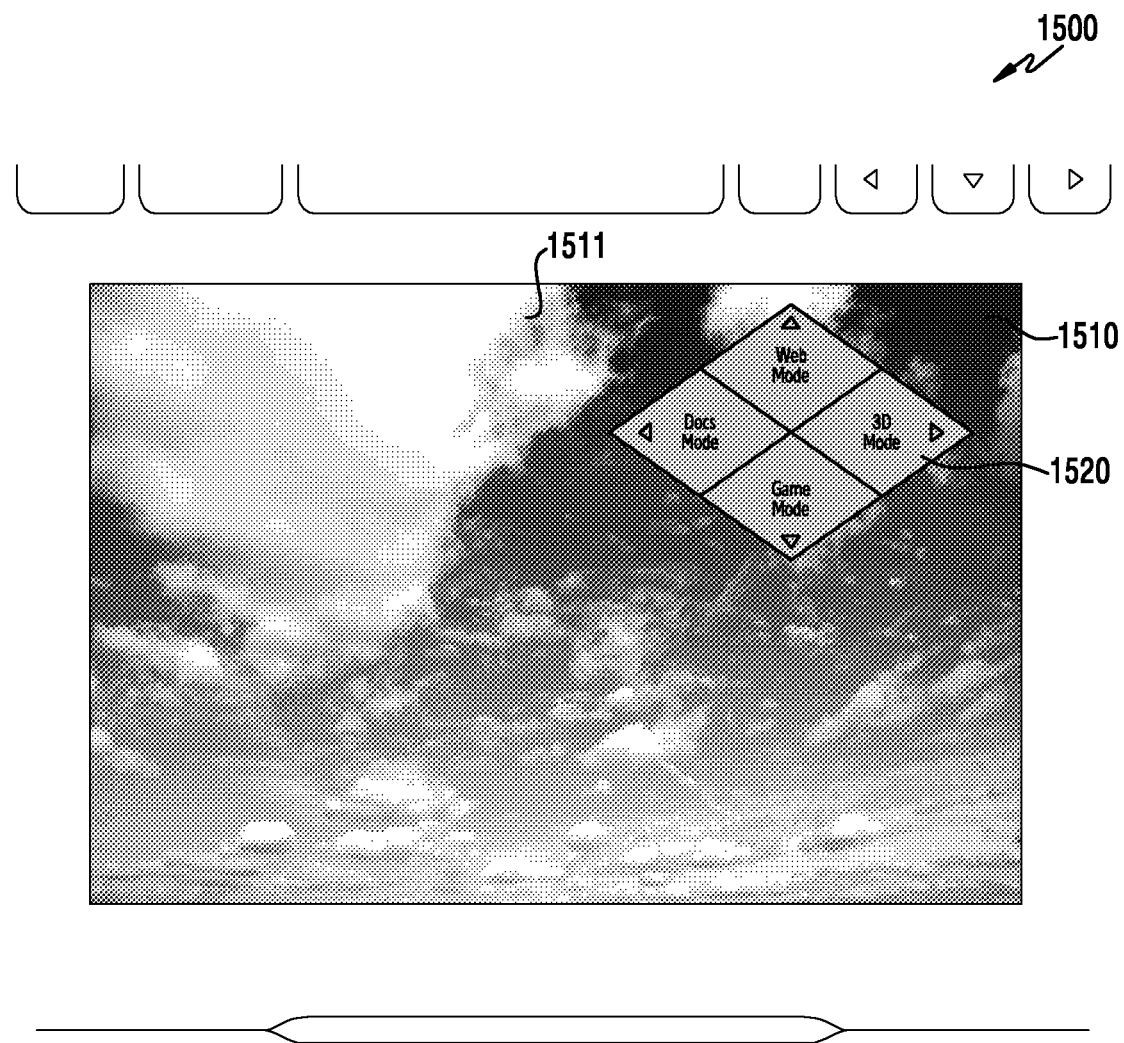

FIG. 15 and FIG. 17 are plan views illustrating GUIs of a touchpad included in an electronic device according to another embodiment of the present disclosure. The touchpad 1510 according to an embodiment may display content 1511, and may display the notification 1520 that may at least partially overlap with the content 1511. The notification 1520 may indicate functions corresponding to upper, lower, left, and right click actions for the touchpad 1510. The user may be provided with other content by using the touchpad 1510, or may move a cursor (e.g., the cursor 211*a* of FIG. 2) displayed on a main display (e.g., the display 211 of FIG. 2). At the same time, functions displayed on the notification 1520 may be executed through the click actions of the touchpad 1510.

An electronic device according to an embodiment of the present disclosure may include: a housing including a first plate and a second plate, where the first plate includes an opening; a display panel at least partially exposed through the opening and including a touch sensor; a first support member coupled to the display panel and a portion of the first plate along at least part of one side of the opening; and a switch device configured to be actuated according to a depression of the display panel, the depression caused by a downward force exerted on an upper portion of the display panel.

The switch device of the electronic device according to the embodiment may include a dome switch or a tactile switch.

The switch device according to the embodiment may be disposed on a bottom surface of the display panel facing the second plate, and the electronic device may further include a second support member fixed at a position so as to actuate the switch device when the display panel is depressed.

According to an embodiment, the second support member may be fixedly coupled to the first plate.

According to an embodiment, the electronic device may further include at least one processor. The at least one processor may be electrically coupled to the display panel and the switch device.

According to an embodiment, the at least one processor may be electrically coupled to the display panel via a first printed circuit board, and may be electrically coupled to the switch device via a second printed circuit board.

According to an embodiment, the electronic device may further include a support structure disposed in a central region of the display panel.

According to an embodiment, the support structure may be disposed on the first support member.

According to an embodiment, the first printed circuit board and/or the second printed circuit board may be disposed at a first side of the display panel different from a second side of the display panel at which the first support member is disposed.

An electronic device according to an embodiment may include: a first housing including a first display panel; and a second housing pivotally coupled with the first housing and including a keyboard and a touchpad. The touchpad may be disposed on a support portion, be exposed through an opening of the second housing, and may include a touch sensor, a second display panel, and a switch device configured to be actuated according to a depression of the touchpad caused by a downward force exerted on the touchpad.

The electronic device according to the embodiment may include four coupling members each disposed at an edge of the support portion to couple the support portion to the second housing. When the downward force is exerted on the touchpad, the touchpad deforms or pivots about an axis connecting opposing two of the four coupling members.

The electronic device according to the embodiment may further include a support member fixed at a position so as to actuate the switch device when the touchpad is depressed.

According to an embodiment, the support member may be fixedly coupled to the second housing.

According to an embodiment, the electronic device may further include at least one processor. The at least one processor may be electrically coupled to the second display panel and the switch device.

According to an embodiment, the at least one processor may be electrically coupled to the second display panel via a first printed circuit board, and may be electrically coupled to the switch device via a second printed circuit board.

According to an embodiment, the electronic device may further include a support structure disposed in a central region of the second display panel.

According to an embodiment, the support structure may be disposed on the support portion.

According to an embodiment, the first printed circuit board and/or the second printed circuit board may be disposed at first side of the second display panel different from a second side of the second display panel at which the support portion is disposed.

According to an embodiment, the switch device may include four switches, each switch disposed on one of the four coupling members.

According to an embodiment, each of the four coupling members may include a slit to facilitate the depression of the touchpad.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   a housing comprising a first plate and a second plate, wherein the first plate comprises an opening and at least one other opening;
   a first display panel at least partially exposed through the opening and comprising a touch sensor;
   a plurality of keys exposed through the at least one other opening, wherein the plurality of keys correspond to a plurality of inputs;
   another housing pivotally coupled to the housing, the another housing including a second display panel, and
   at least one processor configured to:
      control the first display panel to display a group of objects corresponding to a subset of the plurality of keys,
      receive a first input on one of the group of objects displayed in the first display panel,
      in response to the first input, perform a function corresponding to the one of the group of objects, and
      activate a function for moving a pointer that is displayed on the second display panel so that the pointer on the second display panel is moved in response to a second input on the first display panel.

2. The electronic device of claim 1, further comprising:
   a first support member coupled to the first display panel and a portion of the first plate along at least part of one side of the opening; and
   a switch device configured to be actuated according to depression of the first display panel, the depression of the first display panel caused by a downward force exerted on an upper portion of the first display panel;
   wherein the switch device is a dome switch or a tactile switch.

3. The electronic device of claim 2, wherein the switch device is disposed on a bottom surface of the first display panel facing the second plate, and further comprising a second support member fixed at a position so as to actuate the switch device when the first display panel is depressed.

4. The electronic device of claim 3, wherein the second support member is fixedly coupled to the first plate.

5. The electronic device of claim 2, wherein the at least one processor is electrically coupled to the first display panel via a first printed circuit board, and is electrically coupled to the switch device via a second printed circuit board.

6. The electronic device of claim 3, further comprising a support structure disposed in a central region of the first display panel.

7. The electronic device of claim 6, wherein the support structure is disposed on the first support member.

8. The electronic device of claim 5, wherein the first printed circuit board and/or the second printed circuit board are disposed at a first side of the first display panel different from a second side of the first display panel at which the first support member is disposed.

9. The electronic device of claim 1, wherein the plurality of keys include to upper, lower, left, and right keys.

10. The electronic device of claim 1, wherein the function corresponding to the one of the group of objects includes:
    a function that display a graphic user interface (GUI) on the first display panel corresponding to the first input which is received in the first display panel.

11. An electronic device comprising:
    a first housing;
    a plurality of keys disposed on the first housing, wherein the plurality of keys correspond to a plurality of inputs;
    a touchpad configured to display at least one object, wherein the touchpad comprises a touch sensor and is disposed on the first housing;
    a second housing pivotally coupled to the first housing;
    a display panel disposed on the second housing; and
    at least one processor configured to:
       control the touchpad to display a group of objects corresponding to a subset of the plurality of keys,
       receive a first input on one of the group of objects displayed in the touchpad,
       in response to the first input, perform a function corresponding to the one of the group of objects, and
       activate a function for moving a pointer that is displayed on the display panel so that the pointer on the display panel is moved in response to a second input on the touchpad.

12. The electronic device of claim 11, wherein the touchpad is disposed on a support portion, is exposed through an opening of the second housing, and includes a touch sensor, a second display panel, and a switch device configured to be actuated according to a depression of the touchpad caused by a downward force exerted on the touchpad, the electronic device further comprising four coupling members each disposed at an edge of the support portion to couple the support portion to the second housing, wherein when the downward force is exerted on the touchpad, the touchpad deforms or pivots about an axis connecting opposing two of the four coupling members.

13. The electronic device of claim 12, further comprising a support member fixed at a position so as to actuate the switch device when the touchpad is depressed.

14. The electronic device of claim 13, wherein the support member is fixedly coupled to the second housing.

15. The electronic device of claim 12, wherein the at least one processor is electrically coupled to the second display panel via a first printed circuit board, and is electrically coupled to the switch device via a second printed circuit board.

16. The electronic device of claim 15, further comprising a support structure disposed in a central region of the second display panel.

17. The electronic device of claim 16, wherein the support structure is disposed on the support portion.

18. The electronic device of claim 15, wherein the first printed circuit board and/or the second printed circuit board are disposed at a first side of the second display panel different from a second side of the second display panel at which the support portion is disposed.

19. The electronic device of claim 12, wherein the switch device comprises four switches, each switch disposed on one of the four coupling members.

20. The electronic device of claim 12, wherein each of the four coupling members includes a slit to facilitate the depression of the touchpad.

21. The electronic device of claim 11, wherein the function corresponding to the one of the group of objects includes:
- a function that display a graphic user interface (GUI) on the touchpad corresponding to the first input which is received in the touchpad.

* * * * *